No. 5,926.
A. & H. JOHNSON.
FILTER.
PATENTED NOV. 14, 1848.
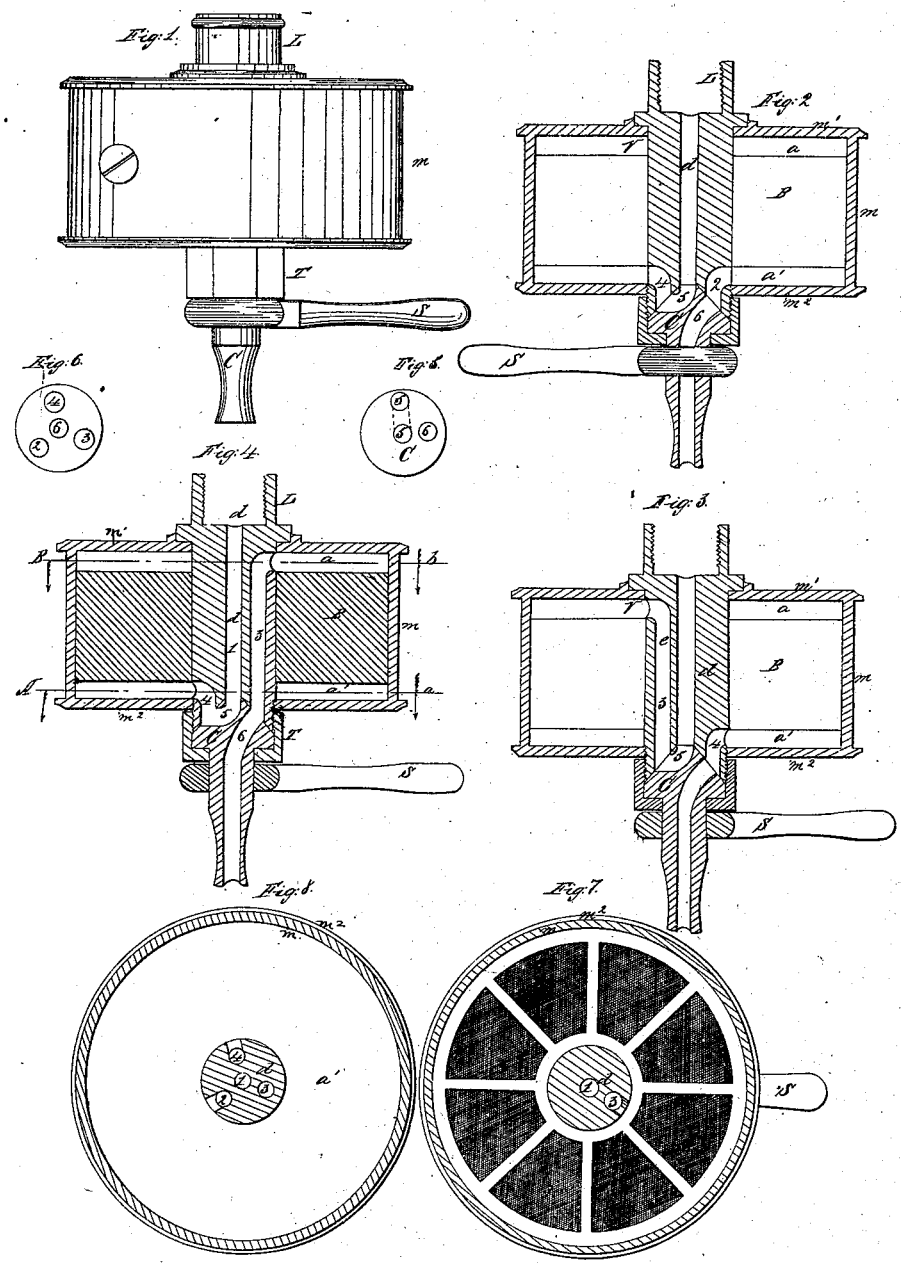

UNITED STATES PATENT OFFICE.

A. JOHNSON AND H. JOHNSON, OF NEW YORK, N. Y.

FILTER STOP-COCK.

Specification of Letters Patent No. 5,926, dated November 14, 1848.

*To all whom it may concern:*

Be it known that we, ABRAHAM JOHNSON and HENRY JOHNSON, of the city, county, and State of New York, have invented new and useful Improvements in the Filter and Cock for Filtering and Drawing Water, and that the following is a full, clear, and exact description of the principle or character which distinguishes them from all other things before known and of the manner of making, constructing, and using the same, reference being had to the accompanying drawings, making part of this specification, in which—

Figure 1 is an elevation; Fig. 2, a vertical section with the parts in the position required for drawing unfiltered water; Fig. 3, a like section with the parts reversed to pass water through the filtering medium; Fig. 4, a like section to represent the parts when drawing filtered water in the reverse direction; Fig. 5, a plan of the cock; and Fig. 6, a horizontal section of the central pipe; Fig. 7 a horizontal section on the line (B *b*) of Fig. 4, and Fig. 8, a cross section on (A *a*) of Fig. 4.

The same letters indicate like parts in all the figures.

The object of our invention is to make an apparatus to be applied to water pipes for the drawing of water with or without being filtered and for reversing the current of water through the filtering medium for cleansing it of the impurities deposited in filtering the water.

The filter consists of a cylindrical case with a filtering diaphragm within it so placed as to have a chamber above and one below it, and through the center of this case passes a pipe the upper end of which is tapped that it may be screwed onto a water pipe, and to its lower end is adapted a two way cock, the first aperture of which enters the center and passes out at the side, and the second enters by the side and passes out through the bottom. And our invention consists, in combination with such a two way cock, making the said central pipe with four passages, the first in the center to receive the water from the water pipe and passing down to the central aperture of the cock, so that in one position the water runs laterally to the second hole in the central pipe which runs up parallel with the first to discharge the water in the upper chamber, which then, without being filtered enters the third aperture, similar to the second, but on the other side at one third of the circle from it, the lower end of which communicates with the second passage in the two way cock to be discharged without being filtered. And when the cock is turned one third around from the position described, the water passes down the central hole, thence laterally through the first passage in the cock to the third hole in the central pipe and up this to the upper chamber, and after passing through the filtering medium to the lower chamber, passes from this to the fourth hole in the central pipe which leads it to the second aperture in the cock to be discharged in a filtered state. And when the cock is turned still another third round the water passes down the central hole, then laterally through the first aperture in the cock, through the fourth hole in the central pipe to the lower chamber and after being filtered by passing up through the filtering medium it passes down from the upper chamber through the second hole and out through the second aperture of the cock, this latter direction of the water having the effect to cleanse the impurities from the filtering medium.

In the accompanying drawings (*m*) represents a metal cylinder or case with two heads (*m′*) and (*m²*), within which is secured a filtering diaphragm (B) of any desired construction of such thickness as to leave a chamber (*a*) above and (*a′*) below it. To the center of this case and in the direction of its axis is adapted a central pipe (*d*) tapped at the upper end that it may be secured to a water pipe, and its lower end has a conical cavity to receive the upper end of a two way cock (C) fitted to it with a ground joint, and secured to it by means of a capnut (T) embracing a shoulder of the cock and having a hole through it for the passage of the nozzle of the cock which has a key (S) adapted to it for the purpose of turning it.

The central pipe has four passages in it; No. 1 passes through it centrally; No. 2 passes up from the lower end parallel with No. 1 to near the top where it turns to communicate with the upper chamber (*a*); No. 3 is similar to No. 2, and No. 4 passes up from the bottom and turns to communicate with the lower chamber (*a′*). The four all open through the bottom, and number 1 alone passes out through the top to receive water from the water pipe. Nos. 2, 3, and 4, are arranged around the center and at equal distances apart, and therefore dividing the circle into three equal parts.

The cock (C) has two passages in it—the first number 5 enters the center of the apex of the cone and passes out at the side at the same distance from the center as the three passages 2, 3, and 4 of the central pipe, so that by turning the pipe the lateral aperture of passage 5 of the cock can be made to communicate with either of them. And the second passage of the cock number 6 enters at the side at the same distance from the center, and passes entirely through the nozzle. By this means it will be seen that when the cock is so turned that its passage number 5 communicates with passages 1 and 2 of the central pipe, passage 6 of the cock with 3 of the pipe, that the water will pass down 1, through 5, up 2, to the upper chamber ($a$), and thence down 3 and out 6 in an unfiltered state. If turned one third around so as to connect 1 and 3 of the central pipe with 6 of the cock that the water will pass down 1 up 3 to the chamber ($a$), thence through the filtering medium to the lower chamber ($a'$), and thence out in a filtered state through 4 and 6. And if turned still another third around so as to connect 1 and 4 of the pipe, and 3 of the pipe with 6 of the cock that the water will pass to the lower chamber ($a'$), pass up through the filtering medium, and thence be discharged in a filtered state from the upper chamber through (3) and (6). The position of these various passages may be reversed so long as they retain the same relative positions.

What we claim as our invention and desire to secure by Letters Patent in a filtering apparatus having two water chambers, one above and the other below the filtering diaphragm, is—

The central pipe with four passages, arranged substantially as herein described, in combination with the two way cock, the passages of which are arranged substantially as herein described, for the purpose of drawing filtered or unfiltered water and reversing the direction of the current through the filtering medium for the cleansing thereof, as herein described.

ABRAHAM JOHNSON.
HENRY JOHNSON.

Witnesses:
 A. B. BROWNE,
 E. A. PETERS.